(12) United States Patent
Yang

(10) Patent No.: US 7,346,895 B2
(45) Date of Patent: Mar. 18, 2008

(54) METHOD OF TRACING DATA COLLECTION

(75) Inventor: Jeaha Yang, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 455 days.

(21) Appl. No.: 10/210,706

(22) Filed: Jul. 31, 2002

(65) Prior Publication Data
US 2004/0025144 A1   Feb. 5, 2004

(51) Int. Cl.
*G06F 9/44* (2006.01)
(52) U.S. Cl. .................................. 717/128; 717/130
(58) Field of Classification Search ........ 717/125–158; 714/25
See application file for complete search history.

(56) References Cited

U.S. PATENT DOCUMENTS

| | | | |
|---|---|---|---|
| 6,269,454 B1 * | 7/2001 | Mann et al. ................... | 714/25 |
| 6,854,108 B1 * | 2/2005 | Choi ........................... | 717/125 |
| 7,165,239 B2 * | 1/2007 | Hejlsberg et al. ............ | 717/114 |
| 2002/0066081 A1 * | 5/2002 | Duesterwald et al. ....... | 717/128 |
| 2002/0112227 A1 * | 8/2002 | Kramskoy et al. .......... | 717/148 |
| 2003/0056200 A1 * | 3/2003 | Li et al. ...................... | 717/128 |
| 2004/0015880 A1 * | 1/2004 | Floyd et al. ................ | 717/128 |
| 2004/0019886 A1 * | 1/2004 | Berent et al. ............... | 717/158 |

* cited by examiner

*Primary Examiner*—Thomas Lee
*Assistant Examiner*—Mark P. Francis
(74) *Attorney, Agent, or Firm*—Ference & Associates LLC

(57) ABSTRACT

Methods and arrangements for collecting tracing data from a plurality of threads of a program. A storage buffer is provided, a first number of units of tracing data for a first thread of the program is determined, and a second number of units of tracing data for a second thread of the program is determined. In the storage buffer, a first block of storage space is reserved for storing the first number of units of tracing data and a second block of storage space is reserved for storing the second number of units of tracing data. Tracing data are thence written concurrently into the first and blocks.

17 Claims, 3 Drawing Sheets

METHOD OF TRACING DATA COLLECTION

FIELD OF THE INVENTION

The present invention relates generally to systems that employ a tracing tool for concurrent or subsequent dynamic analysis of computer programs.

BACKGROUND OF THE INVENTION

Tracing data, or simply "traces", are generated by computer programs for different purposes. One such purpose is profiling whose aim is to assess the dynamic behavior of a target program. "Target program" refers to the program being profiled. More recent developments have involved feeding such traces to visualizers, which represent a more elaborate tool for postmortem or concurrent examination of the dynamic behavior of computer programs.

Profilers and visualizers, like many other applications, often require the trace data to appear in a certain order.

A critical requirement for trace-data collection tools is not to impact the dynamic behavior of the target programs significantly. When the target program is multithreaded, the tracing tool should preferably not load the threads in a biased fashion. The tracing tool should also run as efficiently as possible as it should not impede the target program to the extent of inducing a behavior change which would otherwise not be present in absence of the tracing.

In view of the foregoing, a need has been recognized in connection with overcoming the problems encountered heretofore as well as adequately addressing special challenges presented in connection therewith.

SUMMARY OF THE INVENTION

In accordance with at least one presently preferred embodiment of the present invention, traces are constructed that can exhibit data in a predefined order incommensurate with any requirements of the user of the trace. Also broadly addressed herein is the even distribution of the computational load between the threads of a multithreaded target program. There is also broadly addressed herein the avoidance of impeding the target program to the extent of inducing misbehaviors which would otherwise be absent were the target program not traced.

In summary, the present invention provides, in one aspect, a method for collecting tracing data from a plurality of threads of a program, the method comprising the steps of: providing a storage buffer; determining a first number of units of tracing data for a first thread of the program; determining a second number of units of tracing data for a second thread of the program; in the storage buffer, reserving a first block of storage space for storing the first number of units of tracing data; in the storage buffer, reserving a second block of storage space for storing the second number of units of tracing data, and writing tracing data concurrently into the first block and the second block.

The present invention provides, in another aspect, an apparatus collecting tracing data from a plurality of threads of a program, the apparatus comprising: a storage buffer; an arrangement for determining a first number of units of tracing data for a first thread of the program; an arrangement for determining a second number of units of tracing data for a second thread of the program; an arrangement for reserving, in the storage buffer, a first block of storage space for storing the first number of units of tracing data; an arrangement for reserving, in the storage buffer, a second block of storage space for storing the second number of units of tracing data; and an arrangement for writing tracing data concurrently into the first block and the second block.

Furthermore, the present invention provides, in an additional aspect, a program storage device readable by machine, tangibly embodying a program of instructions executable by the machine to perform method steps for collecting tracing data from a plurality of threads of a program, the method comprising the steps of: providing a storage buffer; determining a first number of units of tracing data for a first thread of the program; determining a second number of units of tracing data for a second thread of the program; in the storage buffer, reserving a first block of storage space for storing the first number of units of tracing data; in the storage buffer, reserving a second block of storage space for storing the second number of units of tracing data, and writing tracing data concurrently into the first block and the second block.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Figure 1:
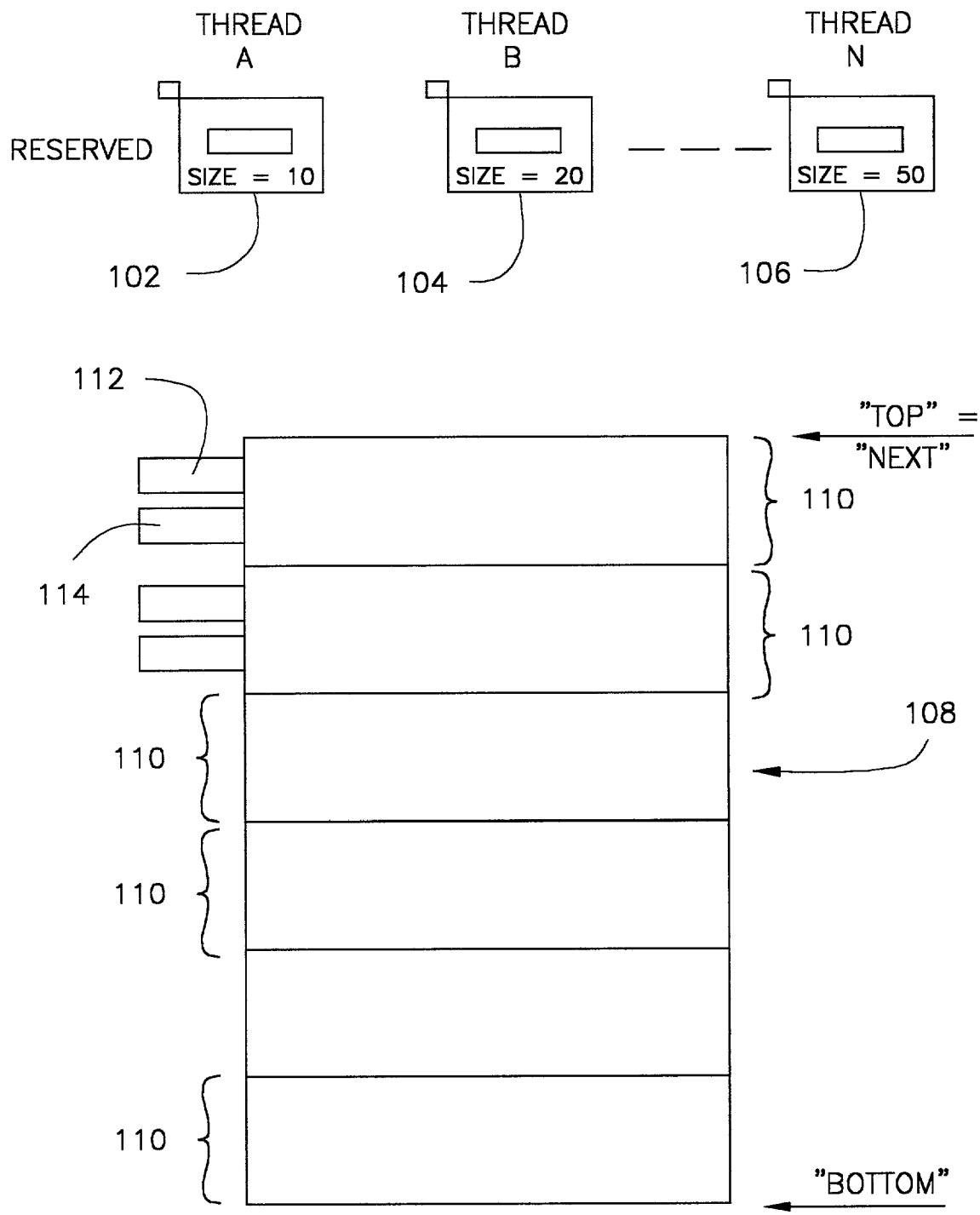
FIG. 1 schematically illustrates a system that incorporates a trace-data collection method.

Generally, there is broadly contemplated herein a method for collection and generation of trace-data that includes the characteristics described above. As such, the trace data will preferably reflect some source events, namely event occurrences in the target program. Again, for generality, the target program is preferably assumed to be multithreaded. The mapping between the source events and trace events is not necessarily one-to-one, and for generality may be assumed to be either one-to-many or many-to-many. Source events are preferably thread-based and, preferably, uneven load distribution between those threads is avoided. Thus, sequential mapping of the source events can deny resources to some thread significantly while providing resources to some other readily, hence leading away from the concept of loading the threads evenly.

To achieve concurrent writing, each thread of the target program is preferably assigned its own filler. A filler is preferably tasked to write the trace events (i.e. the output events) into a single buffer shared by all fillers. (A filler is a program segment which generates a trace event that corresponds to the actual event that occurs during the execution of the program.)

To achieve concurrency, multiple fillers are preferably permitted to write the data to this single buffer concurrently. To achieve concurrent access, each filler preferably only reserves its desired space prior to its writing phase, while competing only for the space reservation phase with the other fillers.

Competition for space reservation among fillers is preferably realized via the known atomic instruction "compare and swap", e.g., as available in the instruction set of popular CPU's (such as Intel Pentium). Atomic instruction had previously been known as atomic operation. In atomic instruction, or atomic operation, an event will complete or return to the original state if operation fails. This will permit only one filler to successfully change the initial value to its desired terminal value, to be used thence as an initial value by other fillers. Fillers that fail will re-attempt reservation.

Preferably, serialization is only applied to space reservation, as opposed to the entire operation which would entail relatively lengthy writing. In short, the lengthy writing phase can proceed concurrently. The reservation scheme is merely tantamount to shifting a buffer head pointer to the beginning of available space.

At some point in time, it will become necessary to flush the buffer. When the buffer is flushed, the contents of the buffer are placed into another location so that the buffer is empty. As flushing issues go, the trace buffer is preferably divided into multiple segments to enable flushing while trace buffer filling proceeds. Thus, filled segments can be safely flushed while trace buffer filling of unfilled segments are in progress. To determine if a segment is filled, the flusher preferably checks at least the following two conditions: 1) whether the segment space is fully reserved and that in turn is sensed by the beginning of available space is beyond the segment; 2) whether, when reservation is granted, each filler increments the use count. Thus when use count is zero, all reserved space has been filled.

In accordance with at least one embodiment of the present invention, it is important that flusher not tax the system when there nothing to flush. To this end, the last filler (i.e. the one decrementing the use count to zero) "wakes up" the flusher and prompts it to flush.

Each segment preferably contains a set number of bytes. It is not a typical for the a segment which has been filled to contain less then the maximum number of bytes permitted in a segment. Thus, the filled segments are generally logical segments which are liable not to end on the precise segment boundaries. When the filler detects insufficient remnant segment space it preferably reserves that space to allow next reservation begin in the subsequent segment. The filler in such an instance reflects the actual segment end for the flusher, so that the flusher need not flush the bytes after the actual end of the segment which were not filled.

The ultimate users of the trace-data, e.g., visualizers, often require that some trace events appear in a predefined order. To this end, a known bitmap scheme is preferably used to indicate if the required event has already been written. It is the concurrent filling scheme that makes the trace vulnerable to error of writing redundant events. This is avoided by enabling only one filler to reserve the space for the required event before other fillers proceed.

The bitmap has been implemented in the context of a vector whose elements are 2-tuples comprising a "status bit" and an "access bit". Fillers first preferably check the "status bit", and only if this "status bit" is not set, fillers enter a "race" to define a required event by attempting to set the "access bit" using the earlier mentioned "compare and wrap" instruction. Other fillers that failed to set the "access bit" wait until the "status bit" is set by the winning filler that sets the "status bit" upon reserving its desired space.

In a presently preferred embodiment of the present invention, a JVMPI-based profiling agent for tracing JAVA™ applications is preferably involved. In this context, the trace-data collection mechanism is viewed as a profiling agent that generates traces concurrent or subsequent visualization. "JVMPI" is a reference to the interface between the JAVA™ virtual machine and an in-process profiler agent. The JVMPI interface and the profiler agent may be viewed as a tracing cool for concurrent or postmortem visualization.

The profiler agent is preferably implemented as a dynamic link library. JVMPI, in this context, may preferably be a two-way function call interface which not only permits the JAVA™ machine to notify the profiler of various events of interest (to the profiler) but also lets the profiler agent issue controls and requests for more information. The virtual machine responds to profiler agent information requests through additional event notification.

The ultimate purpose of the profiler agent will preferably be to provide traces to the front-end (or visualizer). These traces may be conveyed to the visualizer through live links, or alternatively may be written to a file for postmortem visualization.

It should be understood that it is the user who opts for tracing and may exercise his or her option at any time along the execution path of the target program.

Generally, at least one presently preferred embodiment of the present invention relates to the serial updating of a pointer and parallel writing to storage. Referring now to FIG. 1, a computer process is shown in which distributed to different threads. This would be done, for example, in parallel processing. Threads a, b, . . . n are indicated at 102, 104 and 106. The size of Thread A (102) is shown as being 10, the size of Thread B (104) is shown as being 20, and the size of Thread N (106) is shown as being 50. In FIG. 1., each thread (102 . . . 106) is intended to write information to the shared storage 108. In order to write, it must be determined, for each thread, as to where to begin writing in the shared storage 108. Thus, each thread will attempt to "reserve" the required space in shared storage 108. The threads (102 . . . 106) will "request" a reservation nearly simultaneously, however, only one reservation at a time may be assigned. Thus, the threads (102 . . . 106) will continue to obtain a reservation until one is assigned. A reservation is essentially a pointer maintained within the thread indicating the location within the shared storage 108 the thread begins to write. As such, the reservations are assigned (or the pointers are updated) serially. Once the pointers have been updated, the threads may write to the shared storage in parallel.

The shared storage 108 is preferably divided into segments 110 of one hundred bytes, although a segment may be any number of bytes. The first segment is referred to as the "top" and the last segment is referred to as the "bottom". The shared storage 108 preferably provides two pieces of information, an access count 112 and the last valid byte 114. The access count 112 represents the number of fillers writing in the active segment and the last valid byte 114 is the last valid byte in the segment, or in other words, the logical end of the segment.

Figure 2:
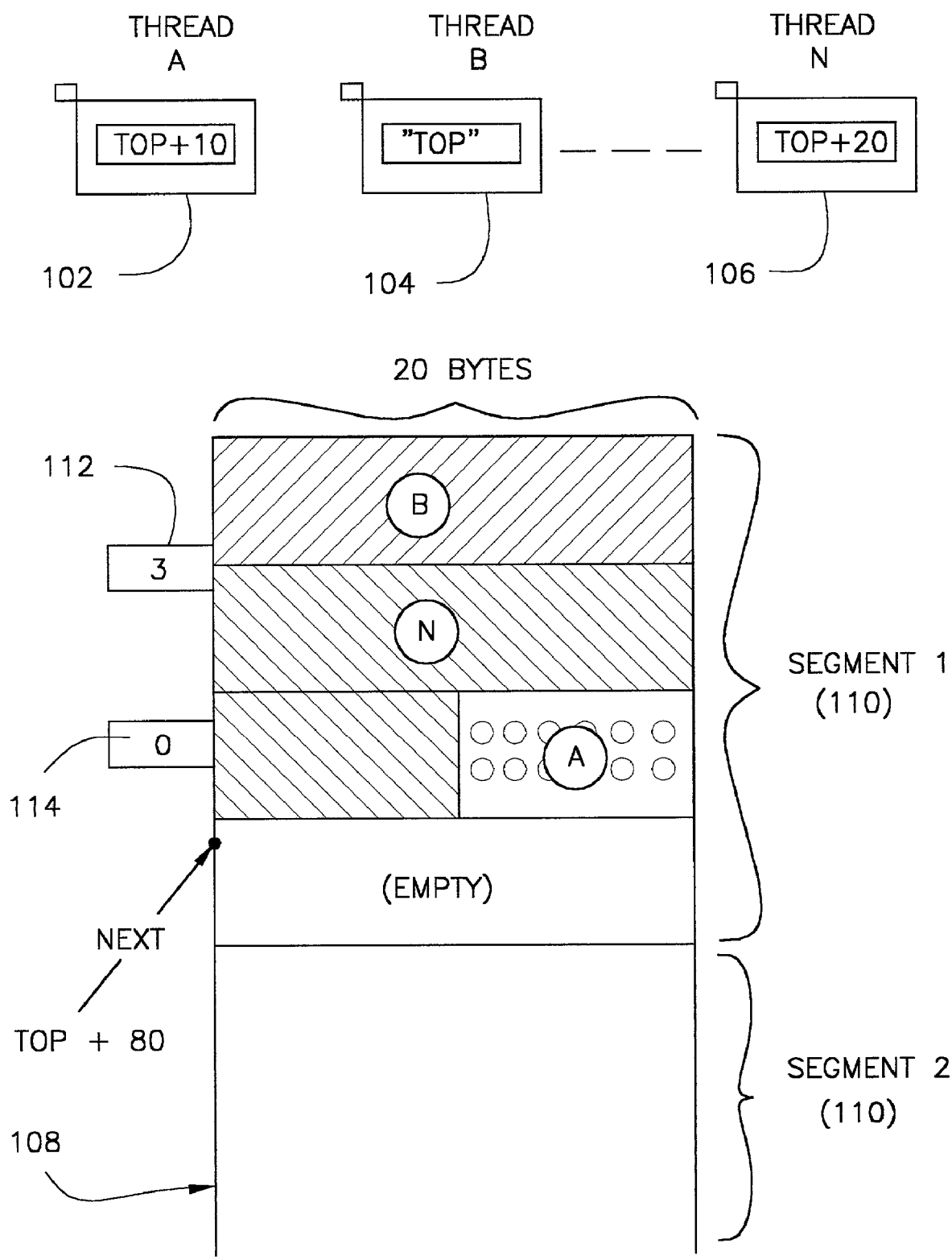
FIG. 2 is substantially the same as FIG. 1 but illustrates an evolved execution of the same.

Referring now to FIG. 2, it is shown that Thread B 104 has obtained the first reservation, followed by Thread N 106, and thence Thread A 102. Thus, as shown in Thread B 104, the "reserved" section or pointer has been updated to contain the value "top". The pointer for Thread N 106 has been updated to contain the value "top+20", with 20 being the size of Thread B 104. The pointer for Thread A 102 has been updated to the value of "top+70", with 70 being the sum of the sizes of the threads previously reserved (Thread B, 20; Thread N, 50).

The bottom of FIG. 2 shows the shared storage 108 as the threads are writing thereto. "Segment 1" in this figure is 100 bytes. The access count 112 shows 3, which means three threads are currently writing to the active segment. The last valid byte 114 shows 0, as the threads have not finished writing. As shown through relative areal dimensions in FIG. 2, Thread B takes up 20 bytes in "segment 1", Thread N takes up 50 bytes, and Thread A takes up 10 bytes, leaving 20 empty bytes available in the segment. As noted, the next byte available for storage in segment 1 is "top+80".

Figure 3:
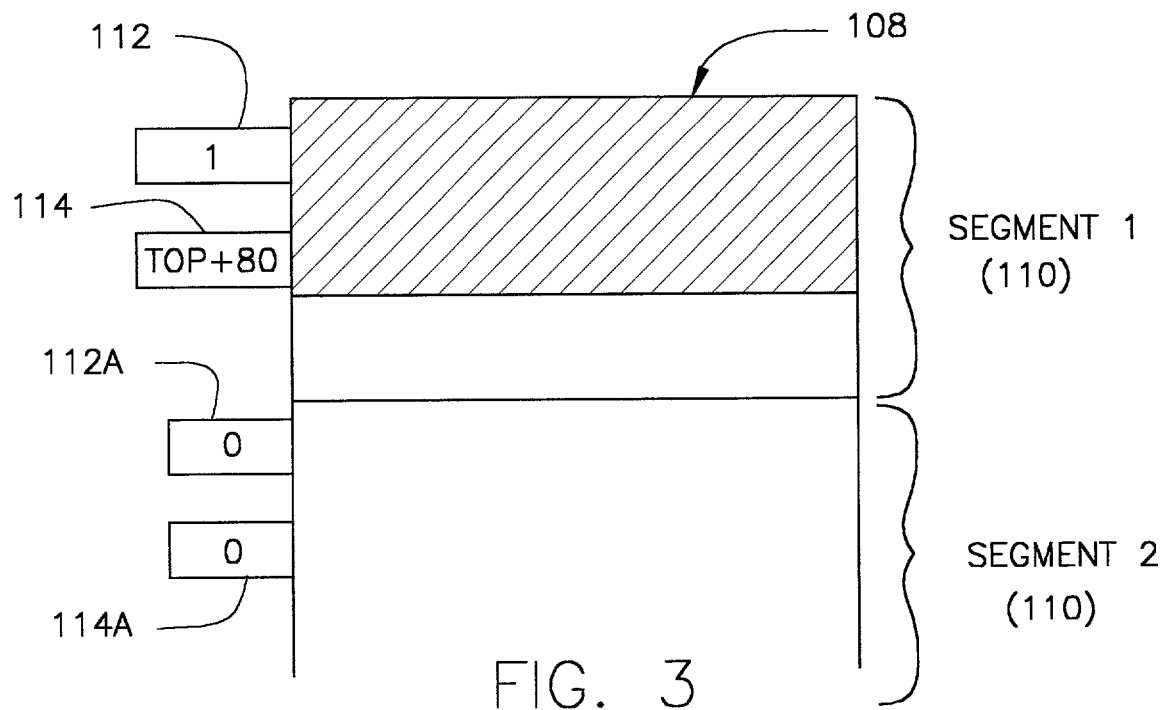
FIG. 3 is substantially the same as FIGS. 1 and 2 but illustrates a different execution.

Referring now to FIG. 3, shown is a situation in which all three Threads have completed writing and Thread N attempts to write 50 bytes again. The access count 112 for "segment 1" is 1, which reflects that one thread is attempting to write to the active segment. The last valid byte value for segment 1 (at 114) is "top+80", and with a segment size of 100 bytes, there is thus not enough room left in the segment for Thread N. As shown, the values for access count 112a and last valid byte 114a, associated with "segment 2", are both at present zero.

Figure 4:
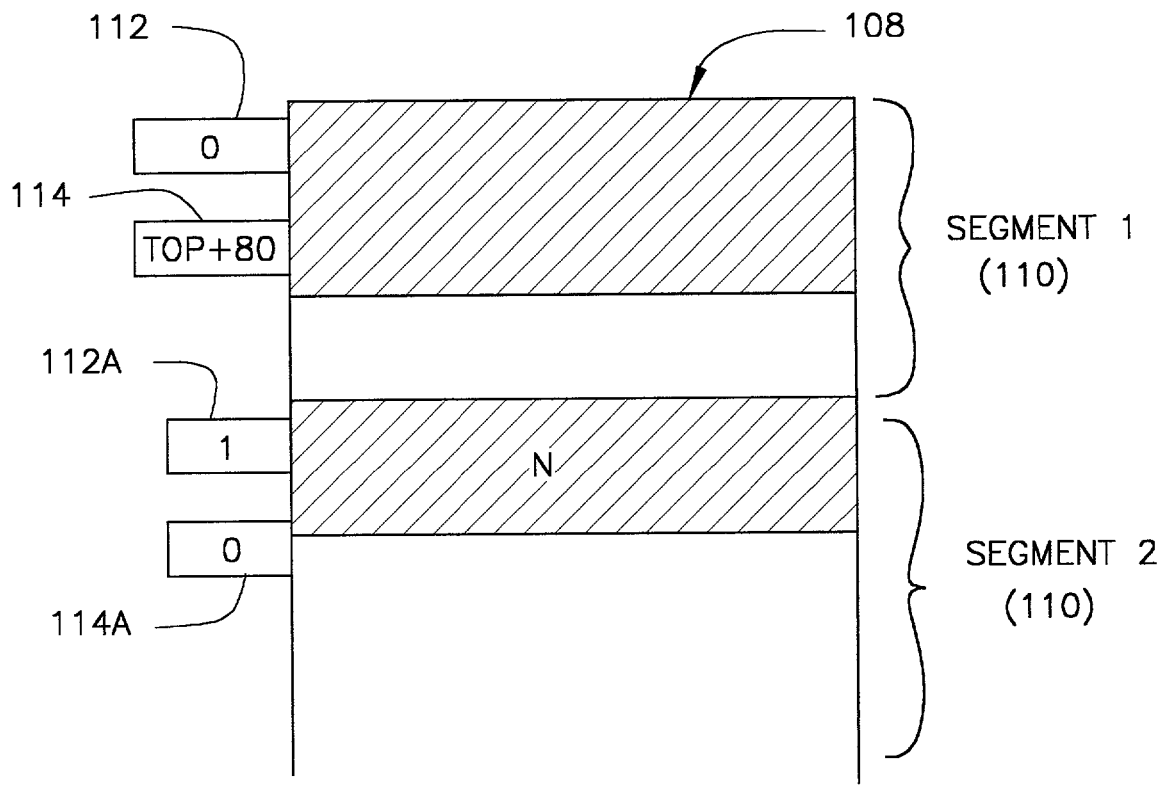
FIG. 4 is substantially the same as FIG. 3 but illustrates an evolved execution of the same.

Referring now to FIG. 4, Thread N is now attempting to write into segment 2 of the shared storage. The access count for segment 2 (at 112a) is 1, which reflects the writing of Thread N, and the corresponding last valid byte (114a) is 0, as the writing has not stopped. Moreover, at this point in time, a flusher would flush segment 1 from the top to top+80 (which is the value of the "last valid byte" of segment 1, indicated at 114).

It is to be understood that the present invention, in accordance with at least one presently preferred embodiment, includes a storage buffer, an arrangement for determining a first number of units of tracing data for a first thread of a program, an arrangement for determining a second number of units of tracing data for a second thread of the program, an arrangement for reserving, in the storage buffer, a first block of storage space for storing the first number of units of tracing data, an arrangement for reserving, in the storage buffer, a second block of storage space for storing the second number of units of tracing data, and an arrangement for writing tracing data concurrently into the first block and the second block. Together, these components may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for collecting tracing data from a plurality of threads of a program, said method comprising the steps of:
    providing a storage buffer;
    determining a first number of units of tracing data for a first thread of said program;
    determining a second number of units of tracing data for a second thread of said program;
    serializing a storage space reservation process by the steps comprising:
        in said storage buffer, reserving a first block of storage space for storing said first number of units of tracing data;
        in said storage buffer, reserving a second block of storage space for storing said second number of units of tracing data, wherein the second block of storage space is subsequent to the first block of storage space; and
    writing tracing data concurrently into said first block and said second block.

2. The method according to claim 1, further comprising the steps of:
    determining whether at least one of said first and second blocks of storage space has been filled with tracing data in a desired manner; and
    transmitting said tracing data from said at least one of said first and second blocks of storage space for visualization analysis upon determining that at least one of said first and second blocks of storage space has been filled with tracing data in a desired manner.

3. The method according to claim 1, further comprising the step of assigning competitive priority to said first and second blocks of storage space to determine the sequence of carrying out said steps of reserving a first block of storage space and reserving a second block of storage space.

4. The method according to claim 3, further comprising the steps of:
    determining whether at least one of said first and second blocks of storage space has been filled with tracing data in a desired manner; and
    transmitting said tracing data from said at least one of said first and second blocks of storage space for visualization analysis upon determining that at least one of said first and second blocks of storage space has been filled with tracing data in a desired manner.

5. The method according to claim 3, further comprising the step of incrementing an initial value of said storage buffer by one of said first number and said second number, pursuant to whether said step of reserving a first block of storage space or said step of reserving a second block of storage space, respectively, is first performed.

6. The method according to claim 5, further comprising the steps of:
    determining whether at least one of said first and second blacks of storage space has been filled with tracing data in a desired manner; and
    transmitting said tracing data from the at least one of said first and second blocks of storage space for visualization analysis upon determining that at least one of said first and second blocks of storage space has been filled with tracing data in a desired manner.

7. The method according to claim 1, wherein each of said threads comprises an application built using a multi-platform, object-oriented programming language that is run on a computer by using a virtual machine.

8. The method according to claim 7, further comprising the steps of:
    determining whether at least one of said first and second blocks of storage space has been filled with tracing data in a desired manner; and transmitting said tracing data from said at least one of said first and second blocks of storage space for visualization analysis upon determining that at least one of said first and second blocks of storage space has been filled with tracing data in a desired manner.

9. An apparatus collecting tracing data from a plurality of threads of a program, said apparatus comprising:
a storage buffer;
an arrangement for determining a first number of units of tracing data for a first thread of said program;
an arrangement for determining a second number of units of tracing data for a second thread of said program;
an arrangement for serializing a storage space reservation process by the steps comprising:
an arrangement for reserving, in said storage buffer, a first block of storage space for storing said first number of units of tracing data;
an arrangement for reserving, in said storage buffer, a second block of storage space for storing said second number of units of tracing data, wherein the second block of storage space is subsequent to the first block of storage space; and
an arrangement for writing tracing data concurrently into said first block and said second block.

10. The apparatus according to claim 9, further comprising:
an arrangement for determining whether at least one of said first and second blocks of storage space has been filled with tracing data in a desired manner; and
an arrangement for transmitting said tracing data from said at least one of said first and second blocks of storage space for visualization analysis upon determining that at least one of said first and second blocks of storage space has been filled with tracing data in a desired manner.

11. The apparatus according to claim 9, further comprising an arrangement for assigning competitive priority to said first and second blocks of storage space to determine the sequence of carrying out said steps of reserving a first block of storage space and reserving a second block of storage space.

12. The apparatus according to claim 11, further comprising:
an arrangement for determining whether at least one of said first and second blocks of storage space has been filled with tracing data in a desired manner; and
an arrangement for transmitting said tracing data from said at least one of said first and second blocks of storage space for visualization analysis upon determining that at least one of said first and second blocks of storage space has been filled with tracing data in a desired manner.

13. The apparatus according to claim 11, further comprising an arrangement for incrementing an initial value of said storage buffer by one of said first number and said second number, pursuant to whether said first block of storage space or said second block of storage space, respectively, has been reserved.

14. The apparatus according to claim 13, further comprising:
an arrangement for determining whether at least one of said first and second blocks of storage space has been filled with tracing data in a desired manner; and
an arrangement for transmitting said tracing data from said at least one of said first and second blocks of storage space for visualization analysis upon determining that at least one of said first and second blocks of storage space has been filled with tracing data in a desired manner.

15. The apparatus according to claim 9, wherein each of said threads comprises an application built using a multi-platform, object-oriented programming language that is run on a computer by using a virtual machine.

16. The apparatus according to claim 15, further comprising:
an arrangement for determining whether at least one of said first and second blocks of storage space has been filled with tracing data in a desired manner; and
an arrangement for transmitting said tracing data from said at least one of said first and second blocks of storage space for visualization analysis upon determining that at least one of said first and second blocks of storage space has been filled with tracing data in a desired manner.

17. A program storage device readable by machine, tangibly embodying a program of instructions executable by the machine to perform method steps for collecting tracing data from a plurality of threads of a program, said method comprising the steps of:
providing a storage buffer;
determining a first number of units of tracing data for a first thread of said program;
determining a second number of units of tracing data for a second thread of said program;
serializing a storage space reservation process by the steps comprising:
in said storage buffer, reserving a first block of storage space for storing said first number of units of tracing data;
in said storage buffer, reserving a second block of storage space for storing said second number of units of tracing data, wherein the second block of storage space is subsequent to the first block of storage space; and
writing tracing data concurrently into said first block and said second block.

* * * * *